United States Patent Office 2,855,310
Patented Oct. 7, 1958

2,855,310
METHOD OF PRODUCING SHORTENING

Albert H. Steffen, Glen Ellyn, Ill., assignor, by mesne assignments, to Swift & Company, a corporation of Illinois No Drawing. Application July 29, 1955
Serial No. 525,390

9 Claims. (Cl. 99—118)

This invention relates to a shortening product and also to the method of producing it. More particularly, this invention is concerned with a method of producing a high quality shortening product from tallow, that is, from either rendered beef fat (beef tallow) or rendered mutton fat (mutton tallow), or mixtures thereof.

It has been know heretofore, as described in Patent Re. 23,499, reissued May 20, 1952, that lard can be modified (rearranged), to produce an excellent shortening which is characterized by its ability to increase the volume of cakes and particularly pound cakes. In the process described in Patent Re. 23,499, natural lard is subjected to rearrangement in the presence of a metal alcoholate rearrangement catalyst at a temperature from about 50 to 150° C. This same process, however, when applied to other fats such as beef or mutton tallow does not result in any appreciable improvement in the pound cake volume obtainable therewith. It has been assumed that rearrangement of natural triglycerides other than lard is not particularly advantageous, and for this reason commercial rearrangement of fats has been almost entirely confined to the rearrangement of lard. Since beef and mutton tallow are available commercially in large quantities, it would be particularly desirable to provide a means for utilizing these fats in the production of a high quality shortening product.

It is therefore a general object of this invention to provide a high quality shortening product from tallow and also a method of producing it. More specifically, it is an object to provide such a shortening product which is characterized by giving good pound cake volumes. Still another object is to provide a shortening product and method of producing it which permits beef or mutton tallow to be employed in substantial quantities. A still further object is to provide a method by means of which a shortening product of substantially uniform composition and properties can be produced from tallow in combination with a wide variety of fats and oils. Further objects and advantages will appear as the specification proceeds.

By means of this invention a high quality shortening product can be produced from a mixture of triglyceride fats containing as much as 25 to 80% tallow. The process involves rearrangement of the fat mixture, and it also involves controlling the proportions in which the tallow and other fats are mixed so that the resulting mixture has certain definite characteristics.

In practicing the method of this invention for producing a shortening product from tallow, the tallow is mixed with at least one other triglyceride fat composed principally from fatty acids containing from 16 to 18 carbon atoms. For example, such triglyceride fats would include natural fats like cottonseed oil and other similar vegetable oils, as well as lard. The tallow may be either rendered beef fat or rendered mutton fat, although rendered beef fat is preferred. Beef tallow is produced and sold commercially under the classes of oleo stock and edible tallow, the principal difference being the temperature at which the beef fat has been rendered. However, for the purpose of this invention, either oleo stock or edible tallow is suitable. By way of specific example, it can be mentioned that excellent results have been obtained with mixtures of beef tallow (oleo stock) and cottonseed oil. Instead of cottonseed oil, other common vegetable oils can be substituted, such as soybean oil, peanut oil, and corn oil.

As already indicated, the proportions in which the tallow and the other fat are mixed must be controlled to produce a mixture having certain definite characteristics. One characteristic is that the tallow should comprise at least 25% by weight of the mixture. For certain embodiments, the amount of tallow can range up to 80% of the mixture while still achieving the other important chacteristics of the mixture. These will now be discussed.

It has been found that the $C_{16}$ and $C_{18}$ trisaturated triglyceride content of the mixture is quite important. At least, there is a certain maximum content which should not be exceeded. More specifically, the $C_{16}$ and $C_{18}$ trisaturated triglycerides should comprise less than 15 mole percent of the total triglycerides of the mixture. The amount being added to the mixture can readily be determined by analysis or from a prior knowledge of the trisaturated triglyceride contents of the separate fats. For example, the trisaturated triglycerides of a natural fat like tallow or cottonseed oil can be separated for analytical purposes by crystallizing the fat in acetone under temperature conditions such that only the trisaturated triglyceride fraction precipitates. Other methods for determining the trisaturated triglyceride content of a fat are known in the art.

Another variable which it is desirable to control is the content of saturated fatty acids in the triglycerides of the mixture, that is, the amount of saturated fatty acids relative to the unsaturated fatty acids. On the basis of the total fatty acid content of the mixture, the saturated fatty acids should comprise from 30 to 50 mole percent. The optimum range seems to be about 40 to 45% saturated fatty acid, or from about 55 to 65% unsaturated fatty acids. The relative contents of saturated and unsaturated fatty acids is either known or readily determinable from most common fats. It is then only a matter of simple calculation to arrive at the desired proportions for producing mixtures of the character described. By way of a fuller explanation, the following may be set forth.

Fats such as beef and mutton tallow and vegetable oils such as cottonseed oil are composed essentially of triglycerides of unsaturated fatty acids containing 18 carbon atoms and saturated fatty acids containing from 16 to 18 carbon atoms. Further, fats such as beef tallow have a relatively high proportion (usually above 50 mole percent) of $C_{16}$ (palmitic) and $C_{18}$ (stearic) saturated fatty acids, while vegetable oils such as cottonseed oil have a relatively low proportion (usually below 30 mole percent) of these saturated fatty acids and have a correspondingly high proportion of unsaturated $C_{18}$ fatty acids (oleic, linoleic, linolenic, etc.). Therefore, it will be apparent that mixtures of the character described for use in the present invention can be produced by blending natural triglycerides like beef or mutton tallow and vegetable oils. They can also be produced by blending lard with tallow or with mixtures of tallow and vegetable oil.

The final requirement or characteristic of the starting material is somewhat more complex and requires considerable explanation. One of the standard tests for a fat or blends of fats is the so-called "pound cake" test. This test results in a figure referred to as the pound cake volume of the triglyceride material which is subjected to the test. Usually, but not always, the trisaturated triglyceride content of the fat is adjusted prior to the test. This is commonly known as "flaking" the fat. Further, it is customary to plasticize and properly temper the fat after flaking and before subjecting it to the pound cake test. With these things in mind, it can then be stated that the final characteristic relates to the pound cake volume performance of the fat mixture before rearrangement, and more particularly to a comparison of the pound cake volume of the properly tempered fat before and after flaking to a definite trisaturated triglyceride content.

Many fat mixtures containing tallow which might otherwise fall within the present invention must be excluded because they do not give a satisfactory pound cake test. More specifically, those mixtures are unsuitable for the purposes of this invention which give a substantially increased pound cake volume upon being flaked to total 15 mole percent $C_{16}$ and $C_{18}$ trisaturated triglycerides than before being flaked. In other words, those mixtures are suitable which fail to give a substantially higher pound cake volume upon adjustment of the $C_{16}$ and $C_{18}$ trisaturated triglycerides therein to 15 mole percent than their pound cake volumes prior to the adjustment. The invention, therefore, contemplates the employment of mixtures which give either a definite decrease or no substantial change in pound cake volume upon flaking under the conditions stated.

The so-called pound cake volume test is now well known in the art and has been adopted as a standard test for shortening products. The details of the pound cake test are described in Patent Re. 23,499, and elsewhere in the literature. When this test is carried out by a person skilled in conducting the test, substantially reproducible results can be obtained, although there will of course be a variation of a few points in the pound cake volume scale between different runs with the same shortening product. However, by using replicate runs and taking an average of the values obtained, a high degree of accuracy and reproduceability is quite feasible. It will be understood, therefore, that the pound cake volume of the starting material for use in this invention is to be determined in accordance with these observations.

After the mixture or blend of tallow and other fats has been produced in the manner described, it is subjected to rearrangement of the fatty acids therein. The rearrangement reaction is preferably carried to substantial completion and flaked. The product of the rearrangement reaction is characterized by giving an appreciably higher pound cake volume upon adjustment of the $C_{16}$ and $C_{18}$ trisaturated triglycerides to 15 mole percent than the pound cake volume of the same product before the adjustment.

While the rearrangement of the triglyceride mixture prepared as described above can be carried out in various ways and according to somewhat different procedures, excellent results have been achieved by employing the rearrangement process described in Patent Re 23,499. Best results are obtained when the fat mixture is heated at an interesterification temperature in the presence of a low temperature rearrangement catalyst, but below a temperature at which the quality of the fat is impaired by heat. More specifically, it is preferred to employ a metal alcoholate rearrangement catalyst for the rearrangement reaction such as sodium methoxide and to conduct the reaction in the liquid phase at a temperature of from about 50 to 150° C. Instead of sodium methoxide, other sodium alcoholates can be used as the rearrangement catalyst, or other alkali metal alcoholates. For the purpose of this invention, it does not matter whether the metal alcoholate catalyst is added to the triglyceride mixture or is formed in situ, for example, by the reaction of metallic sodium or sodium hydride with mono and diglycerides to form sodium glycerates, which are metal alcoholates. The rearrangement reaction can easily be continued until a condition of substantial equilibrium has been reached, and this is the condition which is usually designated by the term "modified" or "rearranged" when applied to a triglyceride mixture. With sodium methoxide and similar catalysts the completion of rearrangement is evidenced by the appearance of a reddish or chocolate brown coloration in the reaction mixture and by a characteristic odor, which is well known to those skilled in the art. Also, for the purpose of this invention, completion of rearrangement is indicated by a pronounced increase in the pound cake volume obtained with shortenings produced by the addition of an appropriate amount of flakes to the mixture which has been subjected to rearrangement.

Reference has been made above to the procedure of "flaking" in connection with the carrying out of pound cake volume tests. Flaking as such is a common practice in which flakes composed essentially of glycerides containing $C_{16}$ and $C_{18}$ saturated fatty acids are added to triglyceride mixtures in the production of shortening products. Further, the figure of 15 mole percent approximates the average trisaturated triglyceride content of commercial shortenings like modified lard shortenings. However, this particular mole percentage in applicant's method has no significance in itself, but instead merely serves as a means for identifying the desired pound cake volume characteristics of the starting material. For adjustment of the trisaturated triglyceride content, cottonseed oil flakes may be adopted as a standard, or any other flakes which give equivalent results.

The present invention in its various aspects and modifications is further illustrated by the following specific examples.

EXAMPLE I

The mixture tabulated in the following examples was rearranged in accordance with the following general procedure:

A quantity of the triglycerides mixture was filtered through coarse filter paper and dried under vacuum. The mixture was brought to 50–55° C. and 1% of sodium methoxide was added with stirring. The mass was kept at 50–55° C. for one hour while stirring. Approximately 3% water was then added to destroy the catalyst and flocculate the sodium soap formed. The mass was kept well above the melting point, filtered, washed twice with hot distilled water, and filtered again. The washed and filtered material was then deodorized two hours at 220° C. under vacuum. The rearranged blend (flaked or unflaked, as the case may be) was plasticized, tempered at 85–90° F. for a suitable length of time, and then subjected to the pound cake test, which is described as follows:

The pound cake test involves the use of a shortening in baking a cake of the following formula:

1 lb. fine granulated sugar
8 oz. shortening
½ oz. salt
8 oz. eggs
8 oz. milk
1 lb. fine cake flour The conditions of mixing and baking are in each instance identical. The volume of the cake in millimeters divided by its weight in grams, multiplied by 100, gives a figure which is representative of the cake volume-producing characteristics of the shortening being tested. The cakes baked according to this standard procedure are modified pound cakes and hereinafter the number arrived at according to the method above explained will be referred to as the "pound cake volume" of the shortening used in the test.

EXAMPLE II

Following the procedure described in Example I, mixtures of oleo stock and cottonseed oil in varying proportions were subjected to rearrangement, and then flaked to 15% trisaturates with hydrogenated cottonseed flakes. The results of these tests are summarized below in Table I:

Table I

| Fat Mixtures | Mole Percent Sat. Fatty Acids | Pound [3] Cake Vol. | W.M.P. | I.V. |
|---|---|---|---|---|
| 100% O. S.[1] | 55 | 235 | 46.7 | 41.3 |
| 85% O. S.+15% C/S [2] | 50 | 246 | 46.7 | 49.6 |
| 66.7% O. S.+33.3% C/S | 45 | 261 | 48.1 | 58.3 |
| 50% O. S.+50% C/S | 40 | 263 | 49.0 | 66.4 |
| 33.3% O. S.+66.7% C/S | 35 | 264 | 51.0 | 73.1 |
| 15% O. S.+85% C/S | 30 | 269 | 52.0 | 84.1 |
| 100% C/S | 25 | 258 | 52.7 | 90.7 |

[1] Oleo stock.
[2] Cottonseed oil.
[3] Flaked to 15% trisaturates with hydrogenated cottonseed flakes.

EXAMPLE III

Following the procedure of Example I, mixtures of prime steam lard, oleo stock, and cottonseed oil in varying proportions were rearranged and then subjected to pound cake volume tests, the results being summarized below in Table II:

Table II

| Fat Mixtures | Mole Percent Sat. Fatty Acids | Pound [4] Cake Vol. | W.M.P. | I.V. |
|---|---|---|---|---|
| 50% P. S. L.[1]+43.5% O. S.[2]+7.5% C/S [3] | 44 | 266 | 48.5 | 55.6 |
| 50% P. S. L.+33.3% O. S.+16.7% C/S | 42.5 | 261 | 49.9 | 58.1 |
| 50% P. S. L.+25% O. S.+25% C/S | 39 | 261 | 50.5 | 62.8 |
| 50% P. S. L.+25% O. S.+25% C/S | 56.5 | 264 | 50.2 | 64.0 |
| 50% P. S. L.+16.7% O. S.+33.3% C/S | 34 | 272 | 51.2 | 66.6 |
| 50% P. S. L.+7.5% O. S.+42.5% C/S | 31 | 264 | 51.6 | 73.5 |

[1] Prime steam lard.
[2] Oleo stock.
[3] Cottonseed oil.
[4] Flaked to 15% trisaturates with hydrogenated cottonseed flakes.

As a control, the prime steam lard employed in the test summarized in Table II prior to rearrangement was flaked to 15% trisaturates with hydrogenated cottonseed flakes and then subjected to certain tests, including a pound cake volume test. Results of these tests are set out below in Table III:

Table III

| Fat | Pound [2] Cake Vol. | W.M.P. | I.V. |
|---|---|---|---|
| Unrearranged P. S. L.[1] | 224 | 51.8 | 57.4 |

[1] Prime steam lard.
[2] Flaked to 15% trisaturates with hydrogenated cottonseed flakes.

EXAMPLE IV

For the purpose of further illustrating these various blends of tallow with cottonseed oil or with lard, or with both lard and cottonseed oil, a series of tests were carried out. In these tests, tallow was blended with the other fats in various proportions, and the resulting mixtures were subjected to standard pound cake volume tests both with and without the adjustment of the trisaturated triglyceride content thereof to 15 mole percent (15% $GS_3$). The results of the test are reported below in Table IV:

Table IV

OLEO STOCK—COTTONSEED OIL SERIES NOT REARRANGED

| Blend | | Pound Cake | |
|---|---|---|---|
| Percent O. S.[1] | Percent C/S [2] | No Flakes | Flaked to 15% $GS_3$[3] |
| 100 | 0 | 236 | ----- |
| 80 | 20 | 232 | 230 |
| 67 | 33 | 269 | 233 |
| 65 | 35 | 260 | 230 |
| 50 | 50 | 254 | 235 |
| 50 | 50 | 278 | 240 |
| 35 | 65 | 230 | 247 |
| 33 | 67 | 247 | 265 |
| 20 | 80 | 187 | 245 |

PRIME STEAM LARD—OLEO STOCK—COTTONSEED OIL SERIES NOT REARRANGED

| Blend | | | Pound Cake | |
|---|---|---|---|---|
| Percent P.S.L.[4] | Percent O.S.[1] | Percent C/S | No Flakes | Flaked to 15% $GS_3$ |
| 100 | ----- | ----- | 158 | 230 |
| 50 | 50 | ----- | 244 | 210 |
| 50 | 42 | 8 | 246 | 223 |
| 50 | 33 | 17 | 237 | 230 |
| 50 | 33 | 17 | 254 | 236 |
| 50 | 33 | 17 | 252 | 260 |
| 50 | 25 | 25 | 224 | 236 |
| 50 | 25 | 25 | 240 | 253 |
| 50 | 17 | 33 | 208 | 230 |
| 50 | 17 | 33 | 230 | 264 |
| 50 | 8 | 42 | 176 | 233 |
| 50 | ----- | 50 | 160 | 247 |

PRIME STEAM LARD—OLEO STOCK SERIES NOT REARRANGED

| Blend | | Pound Cake | |
|---|---|---|---|
| Percent P. S. L. | Percent O. S. | No Flakes | Flaked to 15% $GS_3$ |
| 40 | 60 | 233 | 224 |
| 50 | 50 | 244 | 210 |
| 50 | 50 | 243 | 230 |
| 60 | 40 | 236 | 234 |
| 70 | 30 | 237 | 230 |
| 80 | 20 | 220 | 232 |

[1] Oleo stock.
[2] Cottonseed oil.
[3] $C_{16}$ and $C_{18}$ trisaturated triglycerides.
[4] Prime steam lard.

EXAMPLE V

A reactor tank, equipped with an agitator, was filled with 5,000 lbs. of a vacuum dried mixture containing 50% prime steam lard, 34% beef tallow (oleo stock), and 16% cottonseed oil, having a temperature of about 70° C. Sodium methoxide catalyst was weighed into the tank in the amount of 16.7 lbs. (33⅓%). The mixture was kept at about 70° C. under agitation for 15 minutes, at the end of which time the rearranged mixture was drawn off from the reactor tank in a continuous stream and run into a further processing unit where the mixture was continuously mixed with 1½% water, heated, centrifuged to remove soapstock, washed with hot water, vacuum dried, and dropped into holding tanks. Subsequently, the rearranged mixture was subjected to slight hydrogenation to reduce the iodine value 4.3 points and was then flaked with cottonseed flakes, bleached, and then deodorized by standard procedures. The flavor, texture, appearance, and baking properties of the resulting product were excellent.

While in the foregoing specification this invention has been described with respect to certain embodiments thereof and many details have been set forth in connection with these embodiments, it will be apparent to those skilled in the art that the invention is susceptible to other embodiments and that many details can be varied

I claim:

1. In a method of producing a shortening product, the steps comprising mixing tallow and at least one other triglyceride fat containing principally fatty acids containing from 16 to 18 carbon atoms as starting ingredients, said starting ingredients complying with the following conditions: (1) at least 25% tallow by weight of the ingredients, (2) less than 15 mole percent $C_{16}$ and $C_{18}$ trisaturated triglycerides, (3) from 30–50 mole percent saturated triglycerides, of the total triglycerides of the ingredients, and (4) when saturated triglyceride flakes are added to the ingredients to increase the $C_{16}$ and $C_{18}$ trisaturated triglycerides to 15 mole percent the mixture of the ingredients does not substantially increase pound cake volume; and thereafter subjecting the resulting mixture of ingredients, in the liquid phase and in the presence of an interesterification catalyst, to rearrangement of the fatty acids in the triglyceride molecules, thereby producing a modified product which, after addition of saturated triglyceride flakes to increase the $C_{16}$ and $C_{18}$ trisaturated triglycerides to 15 mole percent, produces a shortening which substantially increases pound cake volume.

2. The method of claim 1 in which said triglyceride fat is selected from the group consisting of lard, vegetable oil, and mixtures of lard with vegetable oil.

3. The method of claim 1 in which said mixture of ingredients includes as principal ingredients beef tallow, lard, and cottonseed oil.

4. The method of claim 1 in which said mixture of ingredients includes as principal ingredients beef tallow and lard.

5. The method of claim 1 in which said mixture of ingredients includes as principal ingredients beef tallow and vegetable oil.

6. In a method of producing a shortening product, the steps comprising mixing tallow and at least one other triglyceride fat containing principally fatty acids containing from 16 to 18 carbon atoms as starting ingredients, said starting ingredients complying with the following conditions: (1) 25–80% tallow by weight of the ingredients, (2) less than 15 mole percent $C_{16}$ and $C_{18}$ trisaturated triglycerides, (3) from 45–45 mole percent saturated triglycerides, of the total triglycerides of the ingredients, and (4) when saturated triglyceride flakes are added to the ingredients to increase the $C_{16}$ and $C_{18}$ trisaturated triglycerides to 15 mole percent the mixture of the ingredients does not substantially increase pound cake volume; and thereafter heating said mixture of ingredients in the liquid phase at an interesterification temperature below a temperature which is injurious to the triglycerides therein in the presence of a low temperature rearrangement catalyst until a condition of substantial equilibrium is obtained.

7. The method of claim 6 in which the interesterification temperature is about 50°–150° C.

8. The method of claim 6 in which the catalyst is an alkali metal alcoholate.

9. The method of claim 6 in which the catalyst is sodium methoxide.

References Cited in the file of this patent

UNITED STATES PATENTS

| | | |
|---|---|---|
| 1,873,513 | Von Loon | Aug. 23, 1923 |
| 2,442,532 | Eckey | June 1, 1948 |
| 2,521,219 | Holman et al. | Sept. 5, 1950 |

FOREIGN PATENTS

| | | |
|---|---|---|
| 357,877 | Germany | Sept. 1, 1922 |

UNITED STATES PATENT OFFICE

CERTIFICATE OF CORRECTION

Patent No. 2,855,310                                      October 7, 1958

Albert H. Steffen

It is hereby certified that error appears in the printed specification of the above numbered patent requiring correction and that the said Letters Patent should read as corrected below.

Column 5, line 41, Table II, second column, for "56.5" read -- 36.5 --; column 8, line 8, for "45-45" read -- 40-45 --; line 18, for "rearangement" read -- rearrangement --; line 30, list of references cited, under the heading, UNITED STATES PATENTS" for "Aug. 23, 1923" read -- Aug. 23, 1932 --.

Signed and sealed this 10th day of February 1959.

(SEAL)
Attest:
KARL H. AXLINE
Attesting Officer

ROBERT C. WATSON
Commissioner of Patents